United States Patent
Folken et al.

(10) Patent No.: US 8,841,787 B1
(45) Date of Patent: Sep. 23, 2014

(54) GENERATOR SET ADAPTIVE DROOP CONTROL METHOD

(71) Applicant: Caterpillar Inc., Peoria, IL (US)

(72) Inventors: Keith Folken, West Peoria, IL (US); Matthew Joseph Meinhart, Peoria, IL (US); Edward Maurer Schroeder, Germantown Hills, IL (US); Andrew William Black, Larne (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/832,946

(22) Filed: Mar. 15, 2013

(51) Int. Cl.
| | |
|---|---|
| *F02D 29/06* | (2006.01) |
| *F03B 13/10* | (2006.01) |
| *F03B 15/08* | (2006.01) |
| *H02P 9/04* | (2006.01) |
| *H02P 11/00* | (2006.01) |
| *G05D 3/12* | (2006.01) |
| *G05D 5/00* | (2006.01) |
| *G05D 9/00* | (2006.01) |
| *H02M 7/48* | (2006.01) |

(52) U.S. Cl.
CPC ..................................... *H02P 11/00* (2013.01)
USPC .............. 290/40 E; 290/7; 700/287; 700/292; 700/295; 363/71; 307/84

(58) Field of Classification Search
CPC .. G05F 1/67; Y02E 10/58; H02M 2001/0025; H02M 2001/007; H02M 3/33515; H02P 9/04; H02P 9/00; H02J 3/385; H02J 3/40; H02J 3/42; H02J 3/00; H02J 4/00; H02J 9/002
USPC ....... 290/7, 40 E; 700/287, 292, 295; 363/71; 307/84
See application file for complete search history.

(56) References Cited

U.S. PATENT DOCUMENTS

| | | | | |
|---|---|---|---|---|
| 4,264,960 | A * | 4/1981 | Gurr ............................. | 700/295 |
| 4,403,292 | A * | 9/1983 | Ejzak et al. ................... | 700/297 |
| 5,731,688 | A * | 3/1998 | Thomson ........................ | 322/22 |
| 5,734,255 | A * | 3/1998 | Thompson et al. ............... | 322/7 |
| 5,754,033 | A * | 5/1998 | Thomson ........................ | 322/45 |
| 5,973,481 | A * | 10/1999 | Thompson et al. ............... | 322/7 |
| 6,002,364 | A * | 12/1999 | Kroeger et al. ............... | 342/359 |
| 6,250,877 | B1 * | 6/2001 | Westphal et al. ............... | 415/17 |
| 6,639,331 | B2 * | 10/2003 | Schultz .......................... | 307/84 |
| 7,248,946 | B2 * | 7/2007 | Bashaw et al. ................ | 700/286 |
| 7,333,352 | B2 * | 2/2008 | Petter et al. ...................... | 363/41 |
| 7,577,006 | B2 | 8/2009 | Neacsu .......................... | 363/71 |
| 7,619,324 | B2 * | 11/2009 | Folken et al. ................... | 307/84 |
| 7,719,866 | B2 * | 5/2010 | Boldo ............................ | 363/89 |
| 8,082,067 | B2 | 12/2011 | Nicoson ........................ | 700/290 |
| 8,106,633 | B2 * | 1/2012 | Dozier et al. ................... | 322/22 |
| 8,358,036 | B2 * | 1/2013 | Dozier et al. ................... | 307/84 |

(Continued)

*Primary Examiner* — Pedro J Cuevas
(74) *Attorney, Agent, or Firm* — Miller, Matthias & Hull (57) ABSTRACT

A method of controlling a plurality of gensets during a failsafe condition is provided. The method may include operating one or more of the gensets according to a modified isochronous control scheme, and operating a remainder of the gensets according an adaptive droop control scheme. The modified isochronous control scheme may include varying the frequency of each isochronous genset with respect to load for lower-range loads and upper-range loads, and maintaining the frequency of each isochronous genset at nominal frequencies for mid-range loads. The adaptive droop control scheme may include adjusting the frequency of each droop genset to match the frequency of the isochronous gensets, and varying the load of each droop genset with respect to frequency for lower-range loads and upper-range loads.

20 Claims, 6 Drawing Sheets

(56) References Cited

U.S. PATENT DOCUMENTS

| | | | |
|---|---|---|---|
| 8,498,752 B2* | 7/2013 | Wells | 700/292 |
| 8,515,588 B2* | 8/2013 | Warner | 700/287 |
| 8,519,565 B2* | 8/2013 | Dozier et al. | 307/44 |
| 8,531,855 B2* | 9/2013 | Lee et al. | 363/97 |
| 8,547,668 B2* | 10/2013 | Dahlen | 361/20 |
| 8,604,630 B2* | 12/2013 | Folken | 290/7 |
| 8,624,431 B2* | 1/2014 | Kanakasabai et al. | 307/32 |
| 8,694,171 B2* | 4/2014 | Ichinose et al. | 700/287 |
| 2008/0179959 A1* | 7/2008 | Folken et al. | 307/80 |
| 2009/0279328 A1 | 11/2009 | Jiang-Häfner | 363/35 |
| 2009/0326724 A1* | 12/2009 | Lasseter et al. | 700/287 |
| 2010/0102637 A1* | 4/2010 | Dozier et al. | 307/84 |
| 2010/0156191 A1* | 6/2010 | Dozier et al. | 307/81 |
| 2010/0241283 A1* | 9/2010 | Desai et al. | 700/295 |
| 2011/0148214 A1* | 6/2011 | Dahlen | 307/87 |
| 2011/0291411 A1* | 12/2011 | Folken | 290/7 |
| 2011/0320053 A1* | 12/2011 | Dozier et al. | 700/287 |
| 2012/0083935 A1* | 4/2012 | Wells | 700/292 |
| 2012/0089270 A1* | 4/2012 | Dozier et al. | 700/295 |
| 2012/0139264 A1* | 6/2012 | Riihimaki | 290/40 B |
| 2012/0200153 A1* | 8/2012 | Henin | 307/9.1 |
| 2012/0232710 A1* | 9/2012 | Warner | 700/287 |
| 2012/0310426 A1* | 12/2012 | Tarnowski | 700/287 |
| 2013/0163287 A1* | 6/2013 | Pal et al. | 363/16 |
| 2014/0001873 A1* | 1/2014 | Tian et al. | 307/87 |
| 2014/0008988 A1* | 1/2014 | Clarke et al. | 307/84 |

* cited by examiner

GENERATOR SET ADAPTIVE DROOP CONTROL METHOD

TECHNICAL FIELD

The present disclosure generally relates to generator sets, and more particularly, to systems and methods for adaptively controlling generator sets during a failsafe droop condition.

BACKGROUND

A generator set, or genset, generally comprises a primary power source, such as an internal combustion engine, or the like, as well as an electric machine, such as induction generators, switched reluctance generators, or any other suitable electric machine commonly employed to convert mechanical energy, or other forms of energy, into electrical energy. In typical implementations, one or more gensets are arranged to communicate generated electrical energy through a shared or common bus that is further supplied to one or more connected loads. The power output by each of the gensets may be individually controlled and monitored by a central control system, which may adjust genset control based on detected changes in load or load demand.

Conventional control systems also provide a failsafe condition or a fallback control scheme for error conditions, such as when there is a loss of communication between one or more of the gensets. In such a failsafe condition, one or more of the gensets operated as droop gensets are automatically placed under a droop control scheme and operated separately from the other gensets operating under an isochronous control scheme. As shown for example in the prior art embodiment of FIG. 1, the isochronous gensets are maintained at nominal, fixed operating frequencies which handle the bulk of the load demand, while the droop gensets are limited to the operating frequencies of the isochronous gensets and set to a predefined target load, such as 50% load, or the like.

Figure 1:
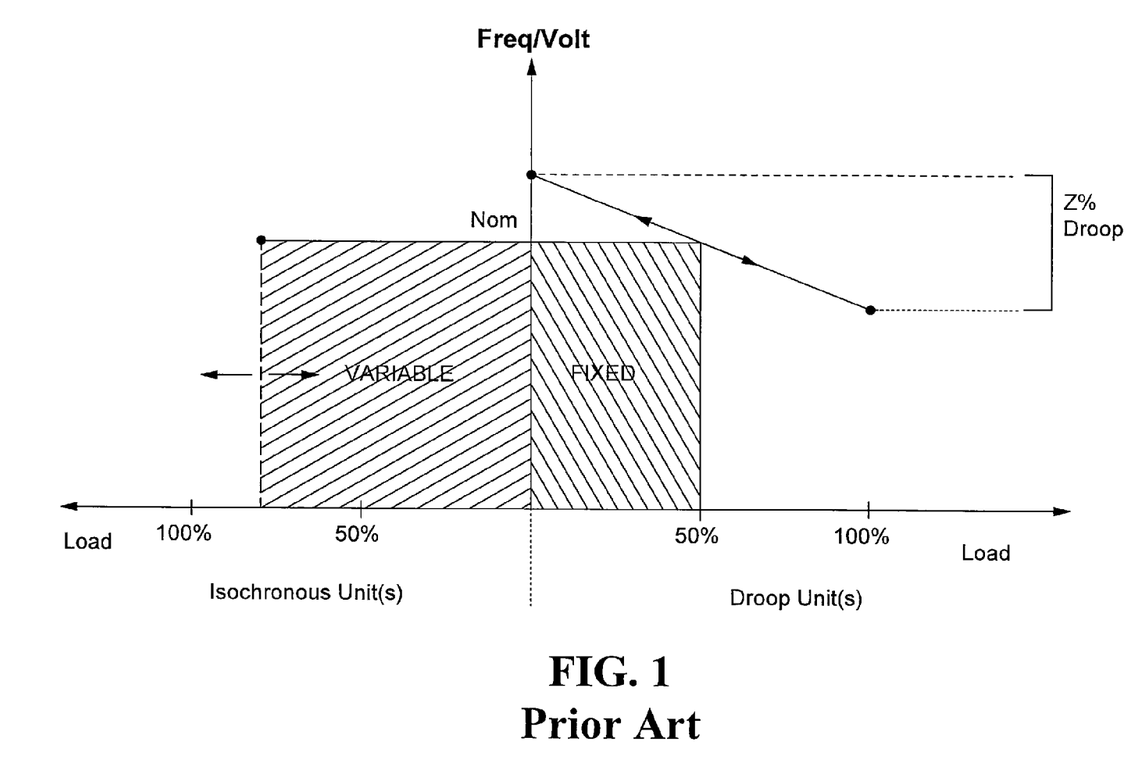
FIG. 1 is a graphical view of a prior art failsafe droop control scheme as applied to a genset system.

This limited flexibility of the droop gensets can introduce several setbacks when the gensets switch in and out of failsafe conditions. For instance, if the droop gensets were operating at a different load percentage immediately prior to entering the failsafe condition, each droop genset would have to abruptly shift its frequency and load point to those dictated by the droop control scheme, as shown in FIG. 1, upon entering the failsafe condition. The abrupt change in genset operation may cause instability in the overall system and a loss of power synchronization. In addition, the droop control scheme does not allow for a more even distribution of loads among the gensets. Under conventional failsafe control schemes, for instance, the isochronous gensets may be allowed to become overloaded even while the droop gensets are underloaded.

The present disclosure is directed at addressing one or more of the deficiencies set forth above.

SUMMARY OF THE DISCLOSURE

In one aspect of the present disclosure, a method of controlling a plurality of gensets during a failsafe condition is provided. The method may include operating one or more of the gensets according to an adaptive droop control scheme. The adaptive droop control scheme may include adjusting the frequency of each droop genset to match the frequency of the isochronous gensets, and varying the load of each droop genset with respect to frequency for lower-range loads and upper-range loads.

In another aspect of the disclosure, an adaptive droop control system for controlling a plurality of gensets during a failsafe condition is provided. The adaptive control system may include at least one controller in electrical communication with one or more of the plurality of gensets, the common bus, and the load. The controller may be configured to operate one or more of the gensets according to an adaptive droop control scheme. The adaptive droop control scheme may configure the controller to adjust the frequency of each droop genset to match the frequency of the isochronous gensets, and vary the load of each droop genset with respect to frequency for lower-range loads and upper-range loads.

In yet another aspect of the disclosure, a genset system is provided. The genset system may include a plurality of gensets having a primary power source and an electric machine configured to generate electrical power, a common bus coupled to each of the gensets and configured to communicate the electrical power generated by the gensets to a connected load, and at least one controller in electrical communication with one or more of the plurality of gensets, the common bus, and the load. The controller may be configured to operate one or more of the gensets according to an adaptive droop control scheme during a failsafe condition. The adaptive droop control scheme may include varying load with respect to frequency for lower-range loads and upper-range loads.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 2:
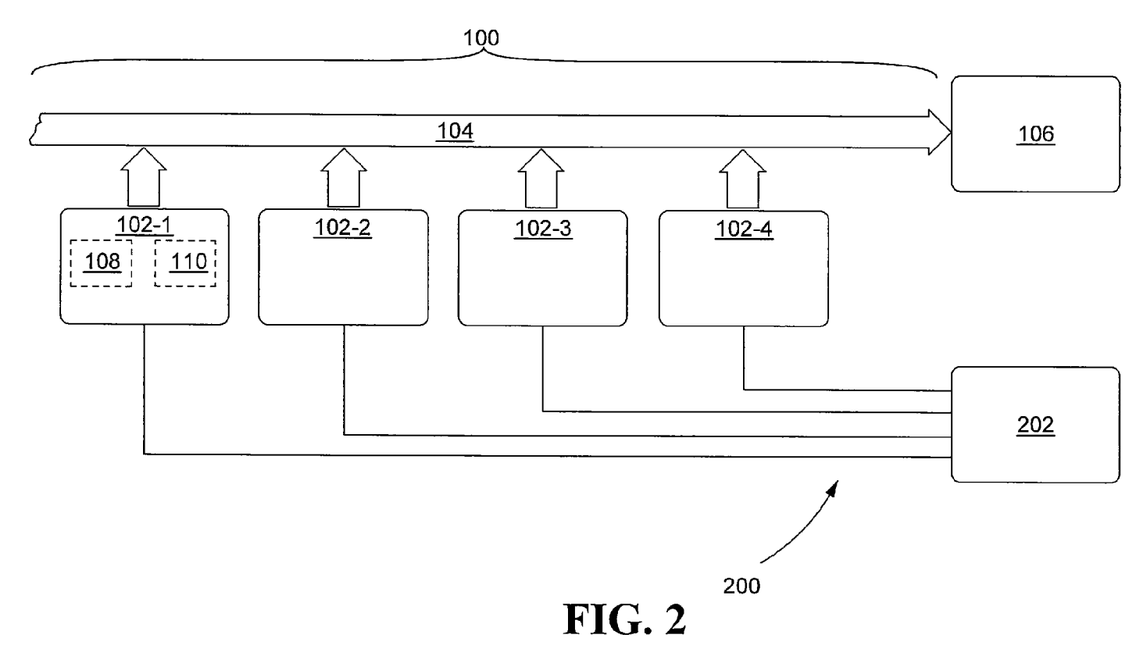
FIG. 2 is a diagrammatic view of one genset system provided with an exemplary adaptive droop control system constructed in accordance with the teachings of the present disclosure.

Referring to FIG. 2, one exemplary embodiment of a system of generator sets, or a genset system 100, is diagrammatically illustrated. As shown, the genset system 100 may generally include a plurality of gensets 102 which are coupled to a common bus 104 and configured to supply electrical power to one or more loads 106 that are in electrical communication with the common bus 104. Each genset 102 may generally include a primary power source 108 and an electric machine 110. The primary power source 108 may include an internal combustion engine or any other comparable prime mover suitable for supplying mechanical energy, or any other suitable source of energy, to the electric machine 110. The electric machine 110 may employ an induction machine, a switched reluctance machine, or any other suitable electric motor or generator commonly used in the art for converting energy supplied by the primary power source 108 into electrical energy.

Still referring to FIG. 2, the genset system 100 may further be provided with an adaptive droop control system 200 having one or more controllers 202 configured to, among other things, operate the genset system 100 according to an adaptive droop control scheme in the event of a fault or failsafe condition, such as in the event communication between one or more of the gensets 102 of the genset system 100 is lost during normal operation. Although the controller 202 is schematically illustrated in FIG. 2 as a separate entity, it will be understood that the controller 202, or one or more controllers 202, may be individually implemented or integrated with each of the gensets 102 of the genset system 100. As shown, the controller 202 of FIG. 2 may be in electrical communication with each of the gensets 102, the common bus 104, the connected loads 106, or any combination thereof, and configured to detect or monitor any variety of operating characteristics of the genset system 100, such as the load demand, the operating frequency and/or load of the individual gensets 102, the common bus voltage and/or frequency, and the like. The controller 202 may further be configured to adjust the operating frequency and/or load characteristics of each genset 102 based on detected changes in operating characteristics of the genset system 100.

Figure 3:
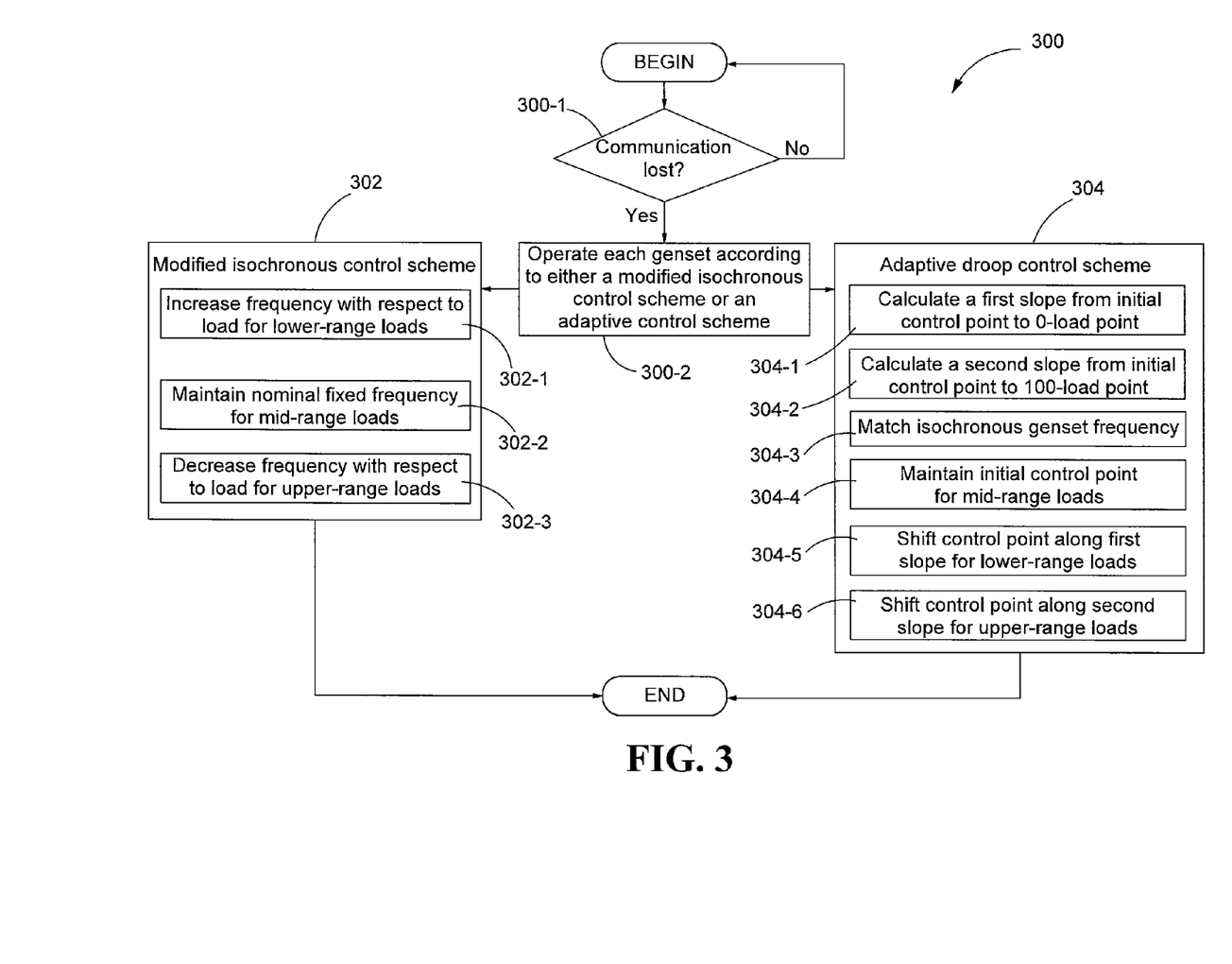
FIG. 3 is a flow diagram of one exemplary algorithm or method of performing an adaptive droop control on a genset system.

Turning to FIG. 3, one exemplary algorithm or method 300 by which the controller 202 of the adaptive droop control system 200 may be programmed to operate is provided. Such an algorithm or set of instructions may be preprogrammed or incorporated into a memory that is disposed within the controller 202 or is otherwise accessible by the controller 202. Furthermore, the controller 202 may be implemented using one or more of a processor, a microprocessor, a microcontroller, a digital signal processor (DSP), a field-programmable gate array (FPGA), an electronic control module (ECM), an electronic control unit (ECU), or any other suitable means for electronically engaging one or more tasks of the adaptive droop control system 200. Specifically, as shown in FIG. 3, the controller 202 during an initial step 300-1 may be configured to determine whether a failsafe condition should be triggered based on various operating characteristics of the genset system 100. For example, the controller 202 may be configured to detect any loss of communication between one or more of the gensets 102 of FIG. 2. If no loss of communication is detected during step 300-1, the controller 202 may be continue monitoring for such satisfying conditions and maintain normal operation of the gensets 102. If, however, a loss of communication is detected, the controller 202 may be configured to trigger the failsafe condition, as indicated by step 300-2 and automatically operate those gensets 102 according to an adaptive droop control scheme 304.

Specifically, if communication with one or more gensets 102 fails, the controller 202 may automatically revert control of those gensets 102 according to the adaptive droop control scheme 304, while the remaining gensets 102, with which communication is maintained, may be operated as isochronous gensets, or gensets being controlled under the modified isochronous control scheme 302. For example, if there is a failure in communicating with only genset 102-4 of FIG. 2, the controller 202 may automatically operate genset 102-4 under the adaptive droop control scheme 304 while operating the remaining three gensets 102-1, 102-2, 102-3 under the modified isochronous control scheme 302. More specifically, according to method 300 of FIG. 3, the controller 202 may be configured to automatically operate the isochronous gensets 102-1, 102-2, 102-3 using the modified isochronous control scheme of step 302, and automatically operate the droop genset 102-4 using the adaptive droop control scheme of step 304 during the failsafe condition. While the following examples and descriptions are based on the foregoing designations, it will be understood that other combinations of isochronous and droop gensets 102 and designations thereof are possible and will be apparent to those skilled in the art.

Figure 4:
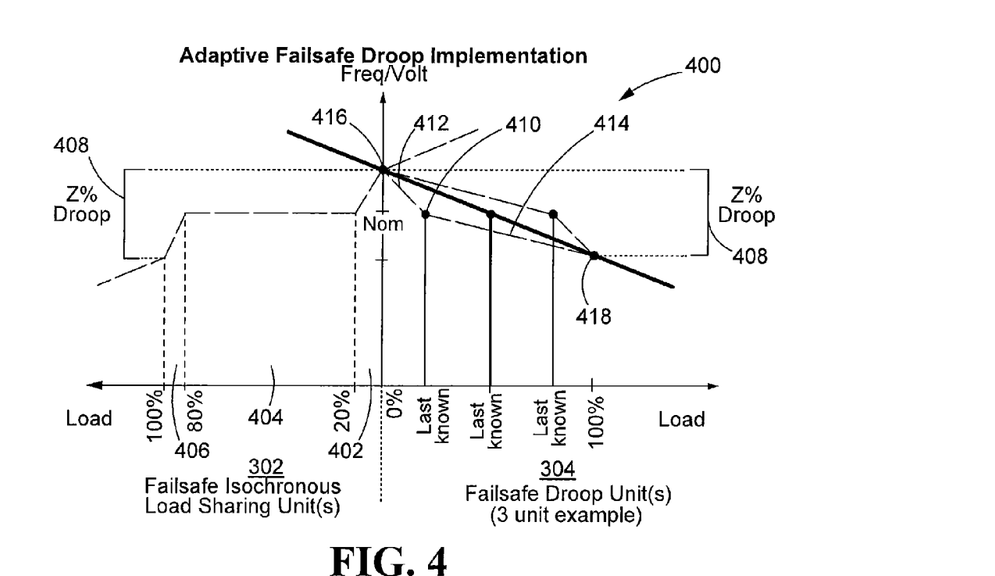
FIG. 4 is a graphical view of one exemplary adaptive droop control scheme as implemented on the genset system of FIG. 2.

During such a failsafe condition, the controller 202 may be configured to operate the isochronous gensets 102-1, 102-2, 102-3, for example, according to the modified isochronous control scheme 302 graphically illustrated by the frequency-load curves 400 of FIG. 4. Initially, the controller 202 may define three or more load regions 402, 404, 406 for the isochronous gensets 102-1, 102-2, 102-3, where the first load region 402 corresponds to lower-range loads, the second load region 404 corresponds to mid-range loads, and the third load region 406 corresponds to upper-range loads. Moreover, the first load region 402 may correspond to loads at which the gensets 102 exhibit a resistance to further decreases in load, while the third load region 406 may correspond to loads at which the gensets 102 exhibit a resistance to further increases in load. For example, the first load region 402 may be designated as loads approximately ranging between 0-20%, the second load region 404 may be designated as loads approximately ranging between 20-80%, and the third load region 406 may be designated as loads approximately ranging between 80-100%. In alternative modifications, the controller 202 may additionally define additional load regions which extend further beyond the load regions 402, 404, 406, for instance for loads below 0% and/or for loads exceeding 100%.

Referring back to FIG. 3, the controller 202 may be configured to increase the operating frequency of the isochronous gensets 102-1, 102-2, 102-3 for lower-range loads in accordance with step 302-1, maintain a nominal, fixed operating frequency for mid-range loads in accordance with step 302-2, and decrease the operating frequency for upper-range loads in accordance with step 302-3. As further illustrated by the frequency-load curves 400 of FIG. 4, for instance, the modified isochronous control scheme 302 may configure the controller 202 to hold the nominal operating frequency for loads approximately ranging between 20-80%. However, if the load decreases below 20%, the controller 202 may be configured to increase the operating frequency of the isochronous gensets 102-1, 102-2, 102-3 so as to compensate for any resistance exhibited during the unloading. Similarly, if the load increases beyond 80%, the controller 202 may be configured to decrease the operating frequency of the isochronous gensets 102-1, 102-2, 102-3 so as compensate for any resistance exhibited during the loading. Accordingly, any initial change in load which occurs during the failsafe condition may be handled by the isochronous gensets 102-1, 102-2, 102-3. Moreover, the rate at which the operating frequency is increased or decreased with respect to load, or the slopes of the frequency-load curves 400 within the first and third load regions 402, 406, may be substantially the same. Still further, the modified isochronous control scheme 302 may be configured within the bounds of a predefined droop limit 408.

During the failsafe condition, the controller 202 may also be configured to operate the droop genset 102-4, for example, according to the adaptive droop control scheme 304 of FIG. 3, also graphically illustrated in the frequency-load curves 400 of FIG. 4. At the outset, the controller 202 may be configured to initialize, or identify the initial control point 410 of each droop genset 102-4. The initial control point 410 may correspond to the last-known operating frequency and/or the last-known load of the droop genset 102-4 observed immediately prior to or upon entering the fault condition. Based on the initial control point 410 and the predefined droop limit 408, the controller 202 may be configured to advantageously define a new and a more adaptive droop scheme by which to control each of the droop gensets 102-4 during the failsafe condition. With reference to the method 300 of FIG. 3, for example, the controller 202 may be configured to adaptively calculate a first slope 412 in step 304-1 as well as a second slope 414 in step 304-2, both of which are specific to the initially observed operating conditions of each individual droop genset 102-4. In contrast to the more generalized and fixed single-slope droop scheme of the prior art embodiment shown in FIG. 1, the adaptive dual-slope droop scheme of FIG. 4 may be able to more gradually ease each droop genset 102-4 into the failsafe droop operation, from the initially observed operating frequency and load to the matched frequency and target load, with less instability and without upsetting the bounds defined by the droop limit 408.

The droop limit 408, as illustrated in FIG. 4 may be preprogrammed within a memory of the controller 202 or otherwise accessible thereto, and further, define at least an upper frequency limit corresponding to a minimum load, or 0-load control point 416, as well as a lower frequency limit corresponding to a maximum load, or 100-load control point 418. More specifically, the first slope 412 may be defined as the slope between the initial control point 410 and the 0-load point 416, while the second slope 414 may be defined as the slope between the initial control point 410 and the 100-load point 418. Correspondingly, the first rate or slope 412 may be calculated based on the difference between the upper frequency limit and the last-known frequency of the droop genset 102-4, in relation to the difference between the minimum load and the last-known load of the droop genset 102-4. Similarly, the second rate or slope 414 may be calculated based on the difference between the lower frequency limit and the last-known frequency of the droop genset 102-4, in relation to the difference between the maximum load and the last-known load of the droop genset 102-4. Moreover, the first slope 412 may be indicative of the manner in which the droop gensets 102-4 are to be controlled when the load decreases, for instance, into the lower-range loads of the first load region 402, while the second slope 414 may be indicative of the manner in which the droop gensets 102-4 are to be controlled when the load increases, for instance, into the upper-range loads of the third load region 406.

Referring back to the method 300 of FIG. 3, the controller 202 in step 304-3 may be configured to adjust the operating frequency of each droop genset 102-4 so as to match the operating frequency of the isochronous gensets 102-1, 102-2, 102-3. As shown in FIG. 4, the operating frequency of the isochronous gensets 102-1, 102-2, 102-3 may be varied only when the load thereon departs from the mid-range loads of the second load region 404. More specifically, when the load on the isochronous gensets 102-1, 102-2, 102-3 falls into the lower-range loads of the first load region 402, the operating frequency of the isochronous gensets 102-1, 102-2, 102-3 may be increased, and when the load on the isochronous gensets 102-1, 102-2, 102-3 falls into the upper-range loads of the third load region 406, the operating frequency of the isochronous gensets 102-1, 102-2, 102-3 may be decreased. Correspondingly, during step 304-3, the controller 202 may be configured to increase or decrease the operating frequency of the droop gensets 102-4 according to these changes to the operating frequency of the isochronous gensets 102-1, 102-2, 102-3. In addition, any change in the operating frequency of the droop gensets 102-4 may further depend on and/or affect the load thereon in accordance to the first and second slopes 412, 414 shown.

Figure 5:
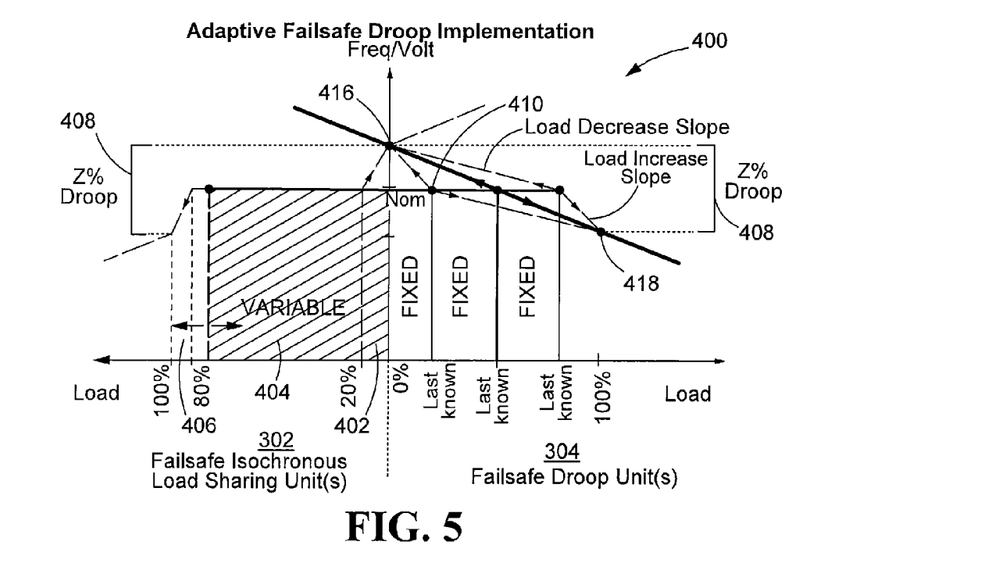
FIG. 5 is a graphical view of the adaptive droop control scheme of FIG. 4 operating at mid-range loads.

As shown in FIG. 4, the controller 202 in steps 304-4, 304-5, 304-6 may be configured to adjust the operating characteristics of each droop genset 102-4 in response to any changes in the operating frequency of the isochronous gensets 102-1, 102-2, 102-3 and in accordance with the first and second slopes 412, 414. In accordance with step 304-4 and as further shown in FIG. 5, the controller 202 may be configured to maintain the initial control points 410, or the initially observed operating frequency and load of the droop gensets 102-4, for any mid-range loads, or changes thereof, which are within the second load region 404. Moreover, load changes that are still within the second load region 404 may not cause any significant resistance to the isochronous gensets 102-1, 102-2, 102-3, and thus, may not affect the operating frequency thereof. However, once the load on the isochronous gensets 102-1, 102-2, 102-3 falls into the lower-range loads of the first load region 402 or the upper-range loads of the third load region 406, the isochronous gensets 102-1, 102-2, 102-3 may encounter resistances to changes in load which may further effect the operating frequency thereof. In such instances, the controller 202 may be configured to adaptively control of the operating frequency and/or load of the droop gensets 102-4 to help compensate for any deficiencies in the output of the isochronous gensets 102-1, 102-2, 102-3 according to steps 304-5 and 304-6 of FIG. 3.

Figure 6:
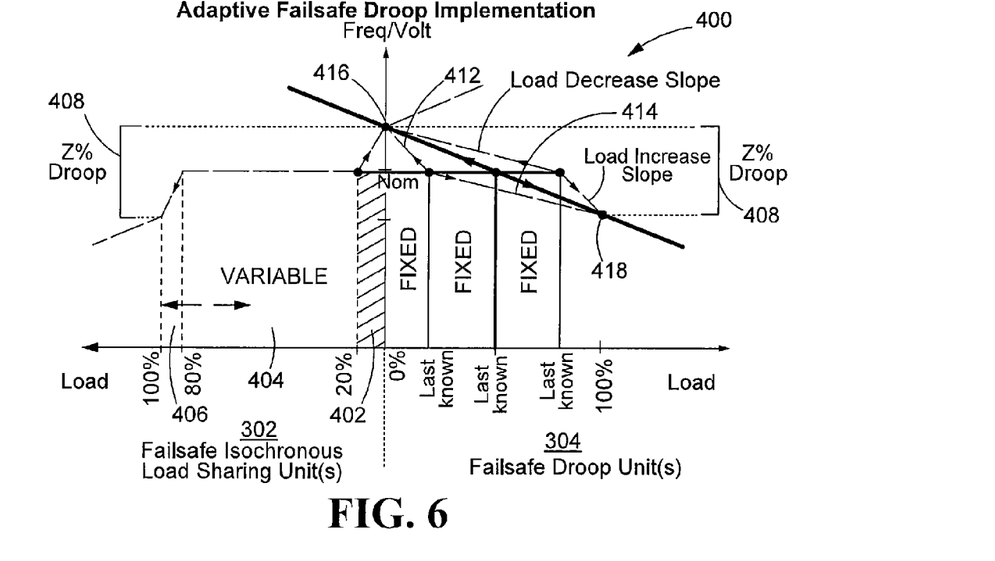
FIG. 6 is a graphical view of the adaptive droop control scheme of FIG. 4 operating at lower-range loads.
Figure 7:
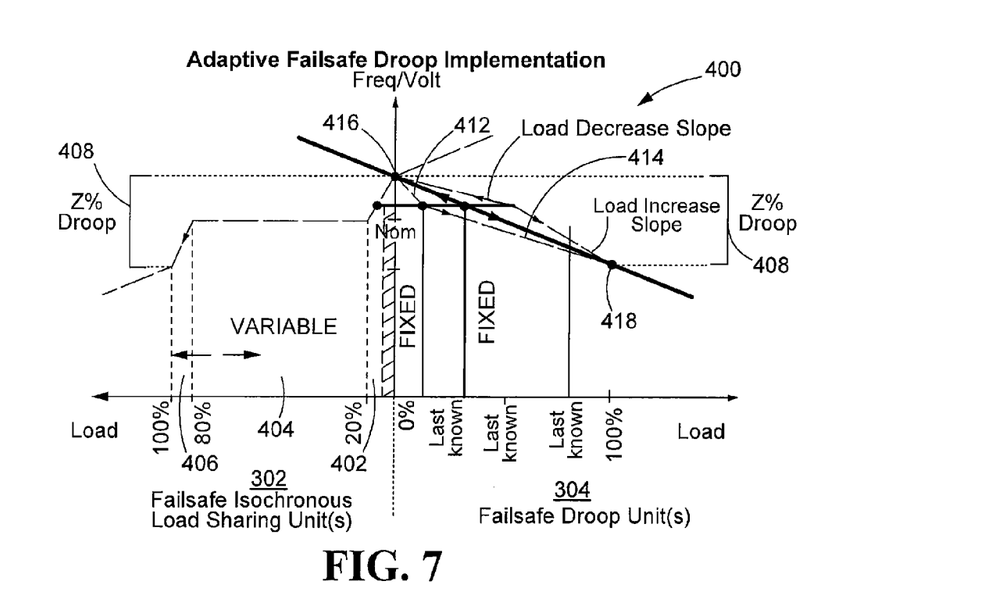
FIG. 7 is a graphical view of the adaptive droop control scheme of FIG. 4 operating at lower-range loads.

When the load on the isochronous gensets 102-1, 102-2, 102-3 begins to fall below the second load region 404 and into the lower-range loads of the first load region 402 as shown in FIG. 6, the controller 202 in step 304-5 may be configured to shift the control point 410 toward the 0-load point 416 and along the first slope 412, thereby increasing the operating frequency of the droop gensets 102-4 as well as unloading or decreasing the load thereon. More specifically, decreases in the load on the isochronous gensets 102-1, 102-2, 102-3 within the first load region 402 may introduce resistances which cause an increase in operating frequency. By decreasing the load on the droop gensets 102-4 with respect to frequency and in accordance with the first rate or slope 412, the controller 202 may effectively match the change in frequency of the isochronous gensets 102-1, 102-2, 102-3 while compensating for any resistances to the unloading exhibited thereby. Once the control point 410 has been appropriately shifted, as shown by example in FIG. 7, the controller 202 may again, as in steps 304-1 and 304-2, adaptively calculate new first and second slopes 412, 414 corresponding to the new control point 410. For example, the controller 202 may calculate the first rate or slope 412 between the new control point 410 and the 0-load point 416, or the difference between the upper frequency limit and the last-known (current) frequency of the droop genset 102-4, in relation to the difference between the minimum load and the last-known (current) load of the droop genset 102-4. Correspondingly, the controller 202 may calculate the second rate or slope 414 between the new control point 410 and the 100-load point 418, or the difference between the lower frequency limit and the last-known (current) frequency, in relation to the difference between the maximum load and the last-known (current) load of the droop genset 102-4. The controller 202 may further reiterate any one or more of the foregoing processes per change in load and as deemed necessary for at least the duration of the fault condition, the loss in communication, or the like.

Figure 8:
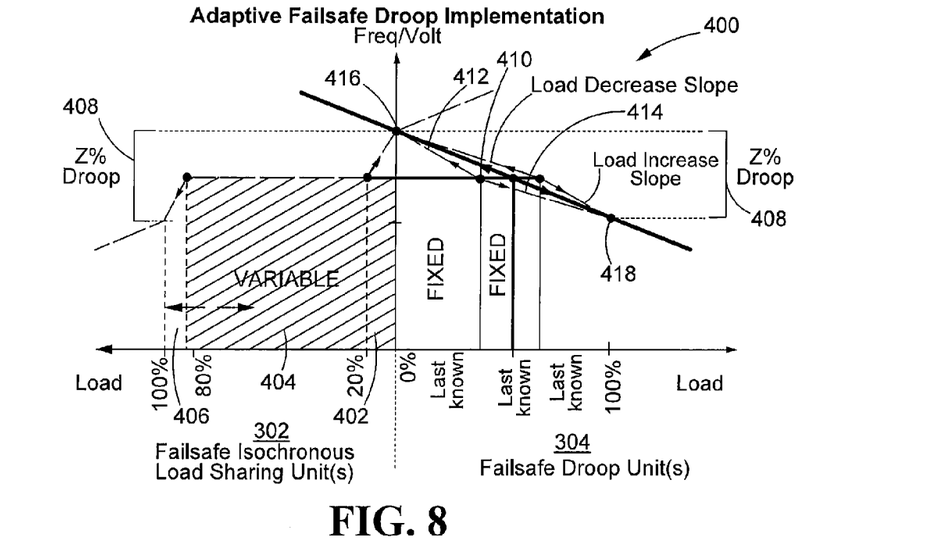
FIG. 8 is a graphical view of the adaptive droop control scheme of FIG. 4 operating at upper-range loads.
Figure 9:
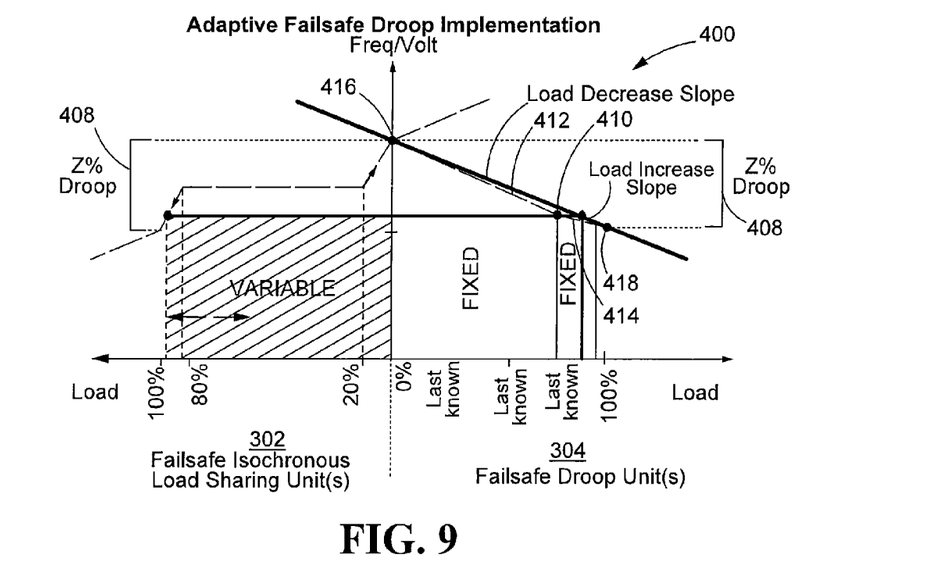
FIG. 9 is a graphical view of the adaptive droop control scheme of FIG. 4 operating at upper-range loads.

Conversely, when the load on the isochronous gensets 102-1, 102-2, 102-3 begins to exceed the second load region 404 and into the upper-range loads of the third load region 406 as shown in FIG. 8, the controller 202 in step 304-6 may be configured to shift the control point 410 toward the 100-load point 418 and along the second slope 414, thereby decreasing the operating frequency of the droop gensets 102-4 and increasing the load thereon. In particular, increases in the load on the isochronous gensets 102-1, 102-2, 102-3 within the third load region 406 may introduce resistances which cause a decrease in operating frequency. Increasing the load on the droop gensets 102-4 with respect to frequency and according to the second rate or slope 414 may enable the controller 202 to effectively match the change in frequency of the isochronous gensets 102-1, 102-2, 102-3 while compensating for the resistances introduced by the increased load. Once the control point 410 has been appropriately shifted, as shown by example in FIG. 9, the controller 202 may reiterate the processes of steps 304-1 and 304-2 and adaptively calculate new first and second slopes 412, 414 corresponding to the new control point 410. For example, the controller 202 may calculate the first rate or slope 412 between the new control point 410 and the 0-load point 416, or the difference between the upper frequency limit and the last-known (current) frequency of the droop genset 102-4, in relation to the difference between the minimum load and the last-known (current) load of the droop genset 102-4. Correspondingly, the controller 202 may calculate the second rate or slope 414 between the new control point 410 and the 100-load point 418, or the difference between the lower frequency limit and the last-known (current) frequency, in relation to the difference between the maximum load and the last-known (current) load of the droop genset 102-4. In addition, the controller 202 may further reiterate any one or more of the foregoing processes per change in load and as deemed necessary for at least the duration of the fault condition, the loss in communication, or the like.

INDUSTRIAL APPLICABILITY

In general, the foregoing disclosure finds utility in any one of a variety of applications which may benefit from improved matching, normalizing and/or balancing of two or more signals in the absence of discrete communications between particular components, modules, or subparts thereof generating the signals. More specifically, the disclosed systems and methods may be used to automatically and adaptively aid in balancing loads among two or more generator sets or gensets during failsafe droop conditions. However, the adaptive schemes of the present disclosure may also be generally applied to any comparable system with automated processes for balancing, maintaining, and/or normalizing, such as ballast tank balancing systems of ocean-going ship stabilizers, audio signal balancing and/or normalizing systems, and the like.

In particular, the disclosed adaptive droop control systems and methods enable a genset system to provide better load distribution among the gensets in the absence of communications therebetween by adapting the droop control scheme for changes in the operating frequency and/or the load. More particularly, the adaptive droop control scheme automatically increases or decreases the load of the droop gensets according to the anticipated behaviors of the majority or isochronous gensets. The present disclosure, thus, not only enables more effective use of the droop gensets during communication failures, but also enables the otherwise fixed operating nature of the droop gensets to compensate for limitations of the isochronous gensets and maintain a more balanced load distribution among the available gensets.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of controlling a plurality of gensets during a failsafe condition, the method comprising:
operating a remainder of the gensets according an adaptive droop control scheme, the adaptive droop control scheme adjusting the frequency of each droop genset to match that of one or more isochronous gensets, and varying the load of each droop genset with respect to frequency for lower-range loads and upper-range loads.

2. The method of claim 1, wherein the method further comprises operating one or more of the gensets according to a modified isochronous control scheme, the modified isochronous control scheme varying the frequency of each isochronous genset with respect to load for lower-range loads and upper-range loads, and maintaining the frequency of each isochronous genset at nominal frequencies for mid-range loads.

3. The method of claim 1, wherein the failsafe condition is triggered by at least a loss of communication between one or more of the gensets.

4. The method of claim 1, wherein a modified isochronous control scheme is employed to increase the frequency of each isochronous genset for lower-range loads, and decreases the frequency of each isochronous genset for upper-range loads, while the adaptive droop control scheme decreases the load of each droop genset if the frequency is increased, and increases the load of each droop genset if the frequency is decreased.

5. The method of claim 1, wherein the frequency of each isochronous genset is varied with respect to load for lower-range loads and for upper-range loads at substantially the same rate.

6. The method of claim 1, wherein lower-range loads correspond to loads at which the gensets exhibit resistance to decreases in load, and upper-range loads correspond to loads at which the gensets exhibit resistance to increases in load.

7. The method of claim 1, wherein the load of each droop genset is varied with respect to frequency at a first rate for lower-range loads and at a second rate for upper-range loads, each of the first rate and the second rate being adaptively calculated based on a predefined droop limit, a last-known frequency of the droop genset, and a last-known load of the droop genset.

8. The method of claim 7, wherein the droop limit defines at least a lower frequency limit corresponding to a maximum load, and an upper frequency limit corresponding to a minimum load, the first rate being calculated based on a difference between the upper frequency limit and the last-known frequency and a difference between the minimum load and the last-known load of the droop genset, the second rate being calculated based on a difference between the lower frequency limit and the last-known frequency and a difference between the maximum load and the last-known load of the droop genset.

9. An adaptive droop control system for controlling a plurality of gensets during a failsafe condition, the adaptive control system comprising:

at least one controller in electrical communication with one or more of the plurality of gensets, the common bus, and the load, the controller being configured to:

operate one or more of the gensets according to an adaptive droop control scheme, the adaptive droop control scheme configuring the controller to adjust the frequency of each droop genset to match that of one or more isochronous gensets, and vary the load of each droop genset with respect to frequency for lower-range loads and upper-range loads.

10. The adaptive droop control system of claim 9, wherein the controller further operates one or more remaining gensets according to a modified isochronous control scheme, the modified isochronous control scheme configuring the controller to vary the frequency of each isochronous genset with respect to load for lower-range loads and upper-range loads, and maintain the frequency of each isochronous genset at nominal frequencies for mid-range loads.

11. The adaptive droop control system of claim 9, wherein the failsafe condition is triggered by at least a loss of communication between one or more of the gensets, the controller being configured to detect the loss of communication.

12. The adaptive droop control system of claim 9, wherein a modified isochronous control scheme is employed to configure the controller to increase the frequency of each isochronous genset for lower-range loads, and decrease the frequency of each isochronous genset for upper-range loads, while the adaptive droop control scheme configures the controller to decrease the load of each droop genset if the frequency is increased, and increase the load of each droop genset if the frequency is decreased.

13. The adaptive droop control system of claim 9, wherein lower-range loads correspond to loads at which the gensets exhibit resistance to decreases in load, and upper-range loads correspond to loads at which the gensets exhibit resistance to increases in load.

14. The adaptive droop control system of claim 9, wherein controller is configured to vary the frequency of each isochronous genset with respect to load for lower-range loads and for upper-range loads at substantially the same rate.

15. The adaptive droop control system of claim 9, wherein the controller is configured to vary the load of each droop genset with respect to frequency at a first rate for lower-range loads and at a second rate for upper-range loads, each of the first rate and the second rate being adaptively calculated based on a predefined droop limit, a last-known frequency of the droop genset, and a last-known load of the droop genset.

16. The adaptive droop control system of claim 15, wherein the droop limit defines at least a lower frequency limit corresponding to a maximum load, and an upper frequency limit corresponding to a minimum load, the controller being configured to calculate the first rate based on a difference between the upper frequency limit and the last-known frequency and a difference between the minimum load and the last-known load of the droop genset, and calculate the second rate based on a difference between the lower frequency limit and the last-known frequency and a difference between the maximum load and the last-known load of the droop genset.

17. A genset system, comprising:

a plurality of gensets, each genset having a primary power source and an electric machine configured to generate electrical power;

a common bus coupled to each of the gensets and configured to communicate the electrical power generated by the gensets to a connected load; and at least one controller in electrical communication with one or more of the plurality of gensets, the common bus, and the load, the controller being configured to operate one or more of the gensets according to an adaptive droop control scheme during a failsafe condition, the adaptive droop control scheme varying load with respect to frequency for lower-range loads and upper-range loads.

18. The genset system of claim 17, wherein the controller is configured to operate any one or more remaining gensets according to a modified isochronous control scheme, the modified isochronous control scheme varying frequency with respect to load for lower-range loads and upper-range loads.

19. The genset system of claim 17, wherein one or more of the gensets are operated according to a modified isochronous control scheme, the modified isochronous control scheme configuring the controller to increase the frequency of each isochronous genset for lower-range loads, maintain the frequency of each isochronous genset at nominal frequencies for mid-range loads, and decrease the frequency of each isochronous genset for upper-range loads, while the adaptive droop control scheme configures the controller to decrease the load of each droop genset if the frequency is increased, and increase the load of each droop genset if the frequency is decreased.

20. The genset system of claim 17, wherein the controller is further configured to:

vary the load of each droop genset with respect to frequency at a first rate for lower-range loads and at a second rate for upper-range loads, each of the first rate and the second rate being adaptively calculated based on a predefined droop limit, a last-known frequency of the droop genset, and a last-known load of the droop genset, the droop limit defining at least a lower frequency limit corresponding to a maximum load, and an upper frequency limit corresponding to a minimum load, calculate the first rate based on a difference between the upper frequency limit and the last-known frequency and a difference between the minimum load and the last-known load of the droop genset, and calculate the second rate based on a difference between the lower frequency limit and the last-known frequency and a difference between the maximum load and the last-known load of the droop genset.

* * * * *